(12) United States Patent
Campian

(10) Patent No.: US 6,234,725 B1
(45) Date of Patent: May 22, 2001

(54) ROTARY CUTTING TOOL

(76) Inventor: Jonathan R. Campian, 4413 Hycliffe, Troy, MI (US) 48098

( * ) Notice: Subject to any disclaimer, the term of this patent is extended or adjusted under 35 U.S.C. 154(b) by 0 days.

(21) Appl. No.: 09/460,545

(22) Filed: Dec. 14, 1999

(51) Int. Cl.$^7$ ................................................. B26D 1/12
(52) U.S. Cl. .............................. 407/54; 407/63; 408/230; 408/67
(58) Field of Search ................. 407/54, 53, 59, 407/58, 63, 62; 408/230, 224, 227, 59, 67

(56) References Cited

U.S. PATENT DOCUMENTS

| 62,123 | 2/1867 | Eglin . | |
|---|---|---|---|
| D. 262,630 | * 1/1982 | Logan, Jr. | 407/53 |
| 2,437,668 | 3/1948 | Adams . | |
| 2,623,552 | * 12/1952 | Compton et al. | 408/227 |
| 3,058,199 | 10/1962 | Cave et al. . | |
| 3,704,517 | * 12/1972 | Deterling | 407/53 |
| 3,913,196 | * 10/1975 | Maday | 408/230 |
| 4,395,167 | 7/1983 | Maternus . | |
| 4,990,035 | 2/1991 | Scheuch et al. . | |
| 5,366,468 | 11/1994 | Fucci et al. . | |
| 5,429,460 | 7/1995 | Campian . | |
| 5,626,444 | 5/1997 | Campian . | |
| 6,164,876 | * 12/2000 | Cordovano | 407/63 |

FOREIGN PATENT DOCUMENTS

| 87 930 | 6/1919 | (DE) . | |
|---|---|---|---|
| 736 449 | 4/1938 | (DE) . | |
| 625848 | * 9/1978 | (SU) | 407/54 |

* cited by examiner

Primary Examiner—A. L. Wellington
Assistant Examiner—Erica Ergenbright
(74) Attorney, Agent, or Firm—Young & Basile, PC

(57) ABSTRACT

A rotary cutting tool is disclosed having an evacuation bore in a shank and generally radially extending passages opening to the bore to conduct away material being removed by cutters. Intersecting cutters are disposed at the intersections of right and left-hand flutes in the tool shank. The right-hand flutes extend along the entire length of the tool shank. The left-hand flutes extend from one end of the shank to an opposite end spaced from the lead end of the shank to leave only the end portion of the right-hand flutes extending to a lead end of the tool shank.

6 Claims, 1 Drawing Sheet

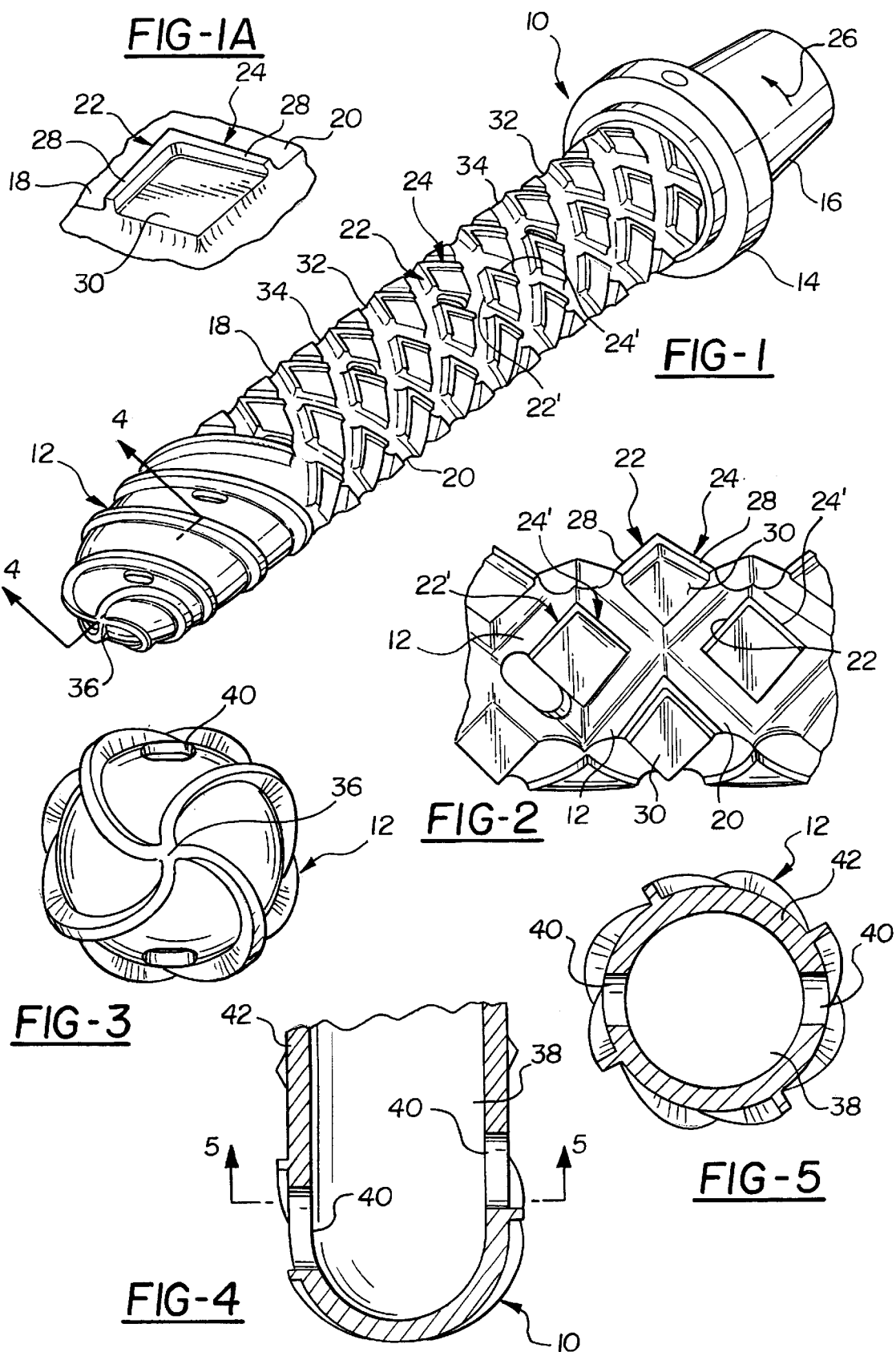

ROTARY CUTTING TOOL

BACKGROUND OF THE INVENTION

1. Field of the Invention

The present invention relates to a cutting tool, and, more specifically, to a rotary milling cutting tool particularly adapted for cutting an expanded synthetic resinous material such as a Styrofoam plastic.

2. State of the Prior Art

As set forth in U.S. Pat. No. 5,429,460 issued in the name of the present inventor, expanded plastic forms are typically hand cut to shape from cast starting blocks of material. A larger starting block of the material is conveniently fabricated by laminating together two or more cast blocks. When a typical hand tool, saw or a grinding-type cutter is used to profile cut the block or to dress the outside surface, a relatively rough finish surface results, primarily from the cellular or bead nature of the foam or expanded plastic material which cause beads or cells to pull away from the stock block being machined.

The aforementioned U.S. Pat. No. 5,429,460 sets forth the details of a machine for cutting expanded plastic work pieces. The basic parameters of the cutting tool are also disclosed which include a rotary cutter having a plurality of generally radially extending openings which fluidly communicate with the axial bore through the cutter. A source of vacuum in the machine entrains cutting material debris in air for evacuating through the radial openings and axial bore.

U.S. Pat. No. 5,626,444, also issued in the name of the present inventor, discloses a rotary cutting tool including features described in the aforementioned patent. This patent also defines the tool as having intersecting cutters disposed at the intersections of right-hand and left-hand flutes in the tool shank which creates components of force in opposite directions along the axis of the tool. In addition, successive axial rows of cutters will overlap diametrical cutting paths alternating between cutters on the leading edges of a right-hand and left-hand helical flute. These oscillating cutting forces in combination with instant evacuation of the material being removed from the workpiece produces a clean, fine, finished work surface.

However, it would still be desirable to provide an improved rotary cutting tool of the kind disclosed in the aforementioned patent which has greater cutting efficiency, particularly at the lead end of the tool in the bottom of a cut hole or bore. It would also be desirable to provide a rotary cutting tool of the aforementioned kind which can be easily inserted into a hole without excess cut material buildup on the tool or below the leading edge of the tool.

SUMMARY OF THE INVENTION

In its basic form, the cutting tool has a longitudinally extending cylindrical shank with an axially extending evacuation bore. Individual cutters are attached to or are an integral part of the shank, and generally radially extending ports pass air entrained with chip or material debris from the cutting flutes to the evacuation bore during the cutting-machining of a workpiece.

In one preferred embodiment of the invention, right-hand, longitudinally extending helical flute grooving and left-hand longitudinally extending helical flute grooving is formed at an angle of 30–60° to the axis of the cylindrical body of the tool shank. An arrowhead shaped cutting flute or intersecting cutters is resultant at the plurality of intersections formed by these right-hand and left-hand helical flute groovings. Also preferably, a radial relief angle and a radial clearance angle are introduced across the top periphery of each flutes land.

The right-hand and left-hand helical flute groovings extend from a mounting flange at one end of the tool shank toward the opposite or lead end of the shank. The right-hand helical grooves extend continuously to the lead end. However, the left-hand helical flute groovings extend from the mounting flange to an end spaced from the lead end of the tool shank.

With this arrangement of intersecting cutters along right-hand and left-hand flutes there will be components of force in opposite directions along the axis of the tool, and that successive axial rows of cutters will overlap diametrical cutting paths alternating between cutters on the leading edges of a right-hand and a left-hand helical flute. These oscillating cutting forces in combination with instant evacuation of the material being removed from the workpiece produces a clean, fine finished work surface.

The elimination of the left-hand flute for a spaced portion extending from the lead end of the tool shank, will remove the opposed component of force along this portion of the tool shank, which is more than compensated for, since the long length of the tool shank provides sufficient opposing forces by the left-hand and right-hand helical flutes to balance the cutting forces applied by the tool shank to the workpiece.

Specifically, the elimination of the left-hand flutes at the end portion of the tool shank extending from the lead end of the tool shank simplify the insertion of the tool shank into a hole while minimizing clogging of the lead end or the buildup of cut material on or adjacent to the lead end of the tool shank. In addition, the provision of only right-hand flutes at the lead end portion of the shank makes the removal of cut material in this portion of the cutting surface of the workpiece more efficient as there will no longer be a component of downward force exerted on the workpiece at the lead end of the tool shank.

BRIEF DESCRIPTION OF THE DRAWINGS

The various features, advantages, and other uses of the present invention will become more apparent by referring to the following detailed description and drawing in which:

FIG. 1 is a perspective view illustrating a preferred embodiment of the cutting tool of this invention;

FIG. 1A is an enlarged perspective view showing a single pair of intersecting cutters on the cutting tool shown in FIG. 1;

FIG. 2 is a partial, side elevational view of the cutting tool of FIG. 1;

FIG. 3 is an end view of the cutting tool of FIG. 1;

FIG. 4 is a cross-sectional view taken along line 4—4 of FIG. 1; and

FIG. 5 is a cross-sectional view taken along line 5—5 of FIG. 4.

DESCRIPTION OF THE PREFERRED EMBODIMENT

Referring to FIGS. 1–5, the cutting tool 10 includes a generally cylindrical body 12 with a mounting flange 14 and tapered shank 16 at one end. Right-hand and left-hand helical flute groovings 20 and 18 are cut into the cylindrical body 12. The right-hand and left-hand flute groovings 20 and 18 extend from the mounting flange 14 on the tapered shank 16 of the cutting tool 10 toward a lead end or drill starting point 36 at one end of the tapered shank 16.

According to one aspect of the present invention, only the right-handle helical flute groovings 20 extend continuously in a helical pattern from the mounting flange 14 to the lead end 36. The left-hand helical flute groovings 18 extend from the mounting flange to end points spaced from the lead end 36. The spacing between the lead end 36 and the end point of the left-hand helical flute groovings 18 is ½ to 1", by example only.

Intersecting cutters 24 and 22 are located at the intersections of the groovings 20 and 18. Primary clearance is provided by a radial relief angle on the land 28 extending from the leading edge of the cutters 22 and 24 with secondary clearance being provided in the recessed area 30 behind the lands 28.

Commonly, the cutting tool 10 of FIGS. 1–5 will have a body 12 diameter of ½ to 3" and a typical working length of 6–20". The helical groovings 18 and 20 will also typically be a multiple thread or flute, with the right-hand helical grooving 20 illustrated in FIG. 1 having four equally spaced parallel flutes with adjacent flutes 32 and 34 being identified.

The rotary cutting tool 10 is in the form of a ball end mill with the drill starting point 36 which can be used in starting a facing or profiling cut. A flat end mill version can also be constructed. An evacuation bore 38 extends the length of the shank 16 with radial ports 40 extending through the shank wall 42 to conduct away the material being removed by machining through the shank wall 42 and into the bore 38.

It can be seen in FIGS. 1, 1A and 2 that the intersecting cutters 22 and 24 at the leading edges of right and left-hand cutters 24 and 22 will produce components of force in opposite directions along the tool axis, and that the leading edges of right and left-hand cutters 24' and 22' in the next axial row of cutters will overlap diametrical cutting paths reversing the force components. These oscillating cutting forces in combination with instantaneous evacuation of machined material produces a clean, smooth and highly accurate surface.

The present invention provides improved performance over prior rotary cutting tools by providing opposing forces by left-hand and right-hand helical flutes along a substantial portion of the length of the tool shank which stabilizes the tool; but only right-hand helical flutes extend to the lead end portion of the tool shank for easier insertion of the tool into a bore as well as more efficient removal of cut material in the bottom portion of the bore below and around the lead end of the tool shank.

What is claimed is:

1. A rotary cutting tool particularly adapted for cutting plastic material comprising:
   a cylindrical body having a longitudinal axis and including a longitudinally extending shank having opposed ends;
   right-hand longitudinally extending helical flute grooving in the shank, the right-hand helical flute grooving extending continuously from one end of the shank to a first end point of the opposite end of the shank;
   left-hand longitudinally extending helical flute grooving in the shank, the left-hand helical flute grooving extending from one end of the shank to a second end point spaced from the first end point of the opposite end of the shank; and intersecting cutters located at intersections of the right-hand and the left-hand helical groovings.

2. The cutting tool of claim 1 including a beveled land extending from a leading edge of each intersecting cutter.

3. The cutting tool of claim 1 wherein said right-hand longitudinally extending helical flute grooving includes a plurality of parallel right-hand longitudinal extending flutes in the cylindrical body, and the left-hand longitudinally extending helical flute grooving includes a plurality of left-hand longitudinally extending helical flutes in the cylindrical body.

4. The cutting tool of claim 1 wherein said right-hand and left-hand helical flutes extend at an angle of 30–60° to the axis of said cylindrical body.

5. The cutting tool of claim 1 further comprising:
   an evacuation bore extending axially along the shank;
   radial passages formed in the shank between at least one of the flute grooves and the evacuation bore; and
   wherein the radial passages are fluidly connected to the evacuation bore so that material removed from a. workpiece by the cutters is evacuated through the radial passages means and the evacuation bore.

6. A rotary cutting tool particularly adapted for cutting plastic material comprising:
   a longitudinally extending cylindrical shank having an axially extending evacuation bore extending between first and second ends of the shank;
   right-hand longitudinally extending helical flute grooving in the cylindrical shank, the right-hand flute grooving extending from the first end to a first end point of the second end of the shank;
   left-hand longitudinally extending helical flute grooving in the cylindrical shank, the left-hand flute grooving extending from the first end of the shank to an second end point spaced from the first end point of the second end of the shank;
   a cutter located at each intersection of the right-hand and the left-hand helical flute groovings, each cutter having a pair of cutting edges, one cutting edge being parallel to the right-hand flute grooving and the other cutting edge being parallel to the left-hand flute grooving;
   radially extending passage means between at least one of the flute groovings and the evacuation bore; and
   wherein the passage means is fluidly connected to the evacuation bore so that material removed from a workpiece by the cutters is evacuated through the passage means and the evacuation bore.

* * * * *